(12) United States Patent
Mittring

(10) Patent No.: US 7,006,090 B2
(45) Date of Patent: Feb. 28, 2006

(54) METHOD AND COMPUTER PROGRAM PRODUCT FOR LIGHTING A COMPUTER GRAPHICS IMAGE AND A COMPUTER

(75) Inventor: Martin Mittring, Coburg (DE)

(73) Assignee: Crytek GmbH, Coburg (DE)

( * ) Notice: Subject to any disclaimer, the term of this patent is extended or adjusted under 35 U.S.C. 154(b) by 310 days.

(21) Appl. No.: 10/360,036

(22) Filed: Feb. 7, 2003

(65) Prior Publication Data
US 2004/0155879 A1    Aug. 12, 2004

(51) Int. Cl.
*G06T 15/00* (2006.01)
(52) U.S. Cl. ........................................ 345/426
(58) Field of Classification Search ............... 345/426
See application file for complete search history.

(56) References Cited

U.S. PATENT DOCUMENTS

| | | | |
|---|---|---|---|
| 4,866,637 A * | 9/1989 | Gonzalez-Lopez et al. . | 345/426 |
| 5,673,374 A * | 9/1997 | Sakaibara et al. ......... | 345/426 |
| 5,710,876 A * | 1/1998 | Peercy et al. ............. | 345/426 |
| 5,880,736 A | 3/1999 | Peercy et al. ............. | 345/426 |
| 6,014,144 A * | 1/2000 | Nelson et al. ............. | 345/426 |
| 6,141,013 A * | 10/2000 | Nelson et al. ............. | 345/426 |
| 6,320,581 B1 * | 11/2001 | Browne ..................... | 345/426 |
| 6,362,822 B1 * | 3/2002 | Randel ...................... | 345/426 |
| 6,384,824 B1 | 5/2002 | Morgan et al. ............ | 345/426 |
| 6,426,749 B1 * | 7/2002 | Knittel et al. ............. | 345/424 |
| 6,497,357 B1 * | 12/2002 | Jackson et al. ............ | 228/264 |
| 6,549,203 B1 * | 4/2003 | Randel ...................... | 345/426 |
| 6,781,594 B1 * | 8/2004 | Day ............................ | 345/589 |

OTHER PUBLICATIONS

Foley et al, Computer Grphics Principles and Practice, 1996, Addison Wesley, Second Edition in C, 721-737, 0-201-84840-6.*

* cited by examiner

Primary Examiner—Ulka J. Chauhan
Assistant Examiner—Enrique L. Santiago
(74) Attorney, Agent, or Firm—Renner, Otto, Boisselle & Sklar, LLP

(57) ABSTRACT

The invention relates to a method to and a computer program product for lighting a computer graphics image to be rendered. It is assumed that a plurality of light sources illuminate one or more objects of the scene to be rendered thus causing a complex lighting situation. For reducing the complexity of the lighting situation and saving computing time the lighting condition is pre-calculated by approximating at least two and preferably all light sources by a single fictitious light source in a pre-calculating step. In the step of pre-calculating, there is computed an approximated light direction for at least two selected ones of the light sources and an approximated light color for the selected light sources by weighting color contributions thereof. The step of pre-calculating is performed for selected areas of a surface of objects present in the scene and results in coefficients that are stored, for these selected areas, in a lightmap or in vertices representing the object surface. The coefficients are retrieved by subsequent method steps for rendering the computer graphics image using the approximated light condition. The invention applies not only to diffuse lighting but is, with a minor modification, also of use for calculating specular lighting.

48 Claims, 4 Drawing Sheets

For each surface element S ( Spos, Snorm )

S1 Reset lightmap output and intermediate values
Ocol = ( 0 , 0 , 0 ), Odir = ( 0 , 0 , 0 ), Osum = 0

S2 For each incoming light element ( Lpos , Lcol , Latt )

S3 Calc attenuation (light distance dependent) factor att in range 0..1
att=CalculateAttenuation( length(Lpos-Spos) , Latt)

S4 Calc normalized light direction
dir = normalize( Spos - Lpos )

S5 Calc visibility factor in range 0..1
vis = CalculateVisibilityFactor(Lpos,Spos)

S6 Sum lightmap contributions
Ocol = Ocol + vis * att * Lcol

S7 Calc luminance
lum = (Lcol_r + Lcol_g + Lcol_b) * att*vis

S8 Sum light directions
Odir = Odir + dir * lum

S9 Sum maximum light vector length
Osum = Osum + lum

S10 Calc lerp factor
If Osum>0 then Olerp = Length(Odir) / Osum
      else Olerp=1

S11 Normalize light direction
Odir = normalize( Odir )

S12 Calculate lightmap max value
bright = max( Ocol_r , Ocol_g , Ocol_b )

S13 Fix oversaturated lightmap color by limiting bump amount
If( bright>1 )

S14 Normalize lightmap color
Ocol = Ocol / bright

S15 calculate correction factor based on brightness e.g. fac = 2-1/bright
fac = SoftExpoureFunction(bright)

S16 Olerp = max( 0 , Olerp - fac+1 )

Fig. 1

| | |
|---|---|
| S50 | Reset lightmap output and intermediate values<br>Ocol = ( 0 , 0 , 0 ), Odir = ( 0 , 0 , 0 ), Osum = 0 |
| S51 | For each incoming light element ( Lpos , Lcol , Latt ) |
| S52 | Calc attenuation factor att in range 0..1 |
| S53 | Calc normalized light direction<br>dir = normalize( Spos - Lpos ) |
| S54 | Calc visibility factor in range 0..1<br>vis = CalculateVisibilityFactor(Lpos, Spos)<br><br>Calc lambert factor<br>lamb = max ( 0 , Snorm * Ldir ) |
| S55 | Sum lightmap contributions<br>Ocol = Ocol + lamb * vis * att * Lcol |
| S56 | Calc luminance<br>lum = (Lcol_r + Lcol_g + Lcol_b) * att |
| S57 | Sum light directions<br>Odir = Odir + dir * lum |
| S58 | Sum maximum light vector length<br>Osum = Osum + lum |
| S59 | Calc lerp factor<br>If Osum>0 then Olerp = Length(Odir) / Osum<br>        else Olerp=1 |
| S60 | Normalize light direction<br>Odir = normalize( Odir ) |
| S61 | Calc lightmap correction factor (lambert calculation)<br>corr = max( 0.01 , Snorm*Odir ) |
| S62 | Apply lightmap correction (divide by zero is excluded)<br>Ocol = Ocol / corr |
| S63 | Calculate lightmap max value<br>bright = max( Ocol_r , Ocol_g , Ocol_b ) |
| S64 | Fix oversaturated lightmap color by limiting bump amount<br>If( bright>1 ) |
| S65 | Normalize lightmap color<br>Ocol = Ocol / bright |
| S66 | Olerp = max( 0 , Olerp – bright + 1 ) |

Fig. 5

METHOD AND COMPUTER PROGRAM PRODUCT FOR LIGHTING A COMPUTER GRAPHICS IMAGE AND A COMPUTER

FIELD OF THE INVENTION

The present invention relates to a method to and a computer program product for lighting a computer graphics image, such as computer-generated images to be used in video games, computer games and computer-generated two- or three-dimensional images or sequences thereof. Furthermore, the present invention relates to a computer programmed to carry out the method of the present invention.

BACKGROUND OF THE INVENTION AND RELATED ART

In video game applications and the like computer-generated images are used for rendering a 3-D scene. For this purpose 3-D graphics cards are used. A common technique for adding realism to synthetic images without adding a lot of geometry is texture mapping. In texture mapping an object surface is computed as being composed of a plurality of geometric primitives, like polygons. A texture is cast onto the geometric object surface by filling the geometric primitives, like polygons, building up object surface.

Recently real-time 3-D graphics cards with bump mapping have become commonly available. Bump mapping is a technique used in advanced shading applications for simulating the effect of light reflecting from small perturbations across a surface. Bump mapping adds per-pixel surface relief shading, increasing the apparent complexity of the surface.

A bump map is an array of values that represent an object's height variations on a small scale. A custom renderer is used to map these height values into changes in the local surface normal. These perturbed normals are combined with the surface normal, and the results are used to evaluate the lighting equation at each pixel. For accurate bump mapping the light source direction must be rotated into a so-called tangent space having three perpendicular axes, one of them being a normal vector perpendicular to the local surface. If the surface is curved, the tangent space orientation changes at every point on the surface. In order to create a tangent space for a surface, it must be mapped parametrically, which can be achieved easily when the object surface is generated from simple geometric primitives, e.g. polygons. Thus the light source must be rotated into tangent space at each vertex of a polygon. Computing the necessary rotation matrices requires substantial computing power.

A further problem associated with bump mapping of the above kind is that the complexity and total computing time required for the rendering process increases drastically with the total number of light sources illuminating the computer graphics image to be rendered.

A related method of the above kind for shading an object surface where bump mapping is performed either in tangent space or in object space is disclosed in U.S. Pat. No. 5,880,736.

At present, 3-D graphics cards with bump mapping are still not fast enough for more sophisticated lighting algorithms. Thus, at present rendering high quality 3-D graphics images is a compromise between using either fast high quality precalculated static lighting without bump maps and specular highlights on the one hand or slow dynamic low quality lighting but with bump maps and specular highlights on the other hand. What is required, are therefore high-speed rendering methods for realistic rendering of 3-D computer graphics images.

One problem that is particularly addressed by the present invention is computing lighting conditions for a computer graphics image of a scene where a plurality of light sources are present illuminating the scene to be rendered. Approaches according to the prior art directed to approximating such a lighting condition include polynomial texture maps and computing diffuse lighting conditions using spherical harmonics. However, with these approaches the computing time necessary to appropriately approximate the actual lighting condition is substantially increased. Thus, there exists a need for approximating complex lighting situations in an efficient and economic manner.

SUMMARY OF THE INVENTION

According to a first aspect of the present invention there is provided a method for lighting a computer graphics image, the computer graphics image including an object surface and at least two light sources illuminating said computer graphics image, comprising the steps of: computing a lighting condition of illuminating said computer graphics image; computing coefficients for areas of said object surface; storing said coefficients for areas or per area of said object surface; and rendering said computer graphics image by retrieving said stored coefficients; wherein said step of computing said lighting condition comprises a step of pre-calculating a substantially static lighting condition, comprising the steps of: (a) calculating an approximated light direction for at least two selected ones of said light sources illuminating said computer graphics image; and (b) calculating an approximated light color for said selected light sources by weighting color contributions of said selected light sources; in which method said coefficients to be stored per object surface area are computed based on said step of pre-calculating.

In the method according to the present invention the object surface consists of a plurality of geometric primitives like a tessellated mesh of polygons building up said object surface. Information on the object surface may be computed once or repetitively while computing said computer graphics image, e.g. the information may be computed on the basis of data defining the object and the object surface using algorithms known to a person skilled in the art for approximating the object surface. Alternatively, information on the object surface may be downloaded from a data storage medium or from a network like an Intranet or the Internet. The information downloaded may define the object surface in detail or may be processed further for obtaining full details of the object surface for subsequent rendering of the object and object surface. Further, a texture map may be generated to be cast onto the object surface. The texture map may be mapped onto the entire surface of the object. Alternatively, a simple, substantially identical texture map may be mapped repeatedly onto different portions of the object surface. During repetitive mapping the texture itself may be varied in accordance with additional effects, like lighting, shadowing, wetting and the like.

According to the present invention coefficients representing the lighting conditions are computed for areas of the object surface. These areas are chosen as to enable computing the lighting conditions to be fast and economic. These areas may be subareas of the object surface as specified by the mesh or the polygons building up the object surface. According to another embodiment the sizes of the areas may be varied in accordance with the importance of the areas, e.g. in case that it is known by an application like a video game application that a viewer viewing the scene to be rendered focuses on certain areas of the scene the size of the areas may be made smaller in the focuses areas and/or may be made larger in other areas. For simplifying computing even further, under special circumstances, like substantially uniform and homogeneous lighting conditions or when an utmost of computing power is to be saved, e.g. for other applications, the area may encompass substantially the entire object surface so that the lighting conditions are substantially identical for the entire object surface. The coefficients to be computed may be floating point numbers, integers, Bit encodings and the like. The coefficients are stored per area, e.g. in a known and preferably fixed relationship to the areas of the object surface, preferably taking into account additional parameters like orientation with regard to a surface normal, surface position and the like. Once stored, the coefficients can be retrieved or accessed at any time for rendering the computer graphics image under a given lighting condition. The coefficients may, of course, also be used by other applications or procedures.

According to the present invention a complex lighting condition can be pre-calculated and compressed by calculating an approximated averaged light direction and light color of selected ones or even all of a plurality of light sources of the scene. The approximated averaged light direction and light color is thus used as a fictitious single light source representing the selected ones or even all of said plurality of lights sources present in the scene to be rendered. Thus even a complex lighting situation caused by the presence of more than one light source in the scene can be computed in an efficient manner while saving computing power without losing per pixel lighting. While the approximation performed by the above method may be too coarse under certain circumstances requiring an exact approximation, under standard circumstances and in particular in high-speed video game applications or sequences thereof requiring fast response of the application or sequence, e.g. in case of panning or zooming the approximation is nevertheless satisfactory. As will become apparent from the following the approach of the present invention is intended as a compromise being viable in particular for a computing environment offering facilities of limited computing power and memory space.

According to the present invention, the coefficients representing the complex lighting condition, once pre-calculated, can be re-used for subsequent image rendering thus saving computing power and reducing hardware requirements even further. Furthermore, the coefficients can be stored efficiently in memory space widely available in 3-D computer graphics cards.

According to the present invention the result of the step of pre-calculating may be stored in a lightmap, which is a texture map to be applied to surfaces of objects in the computer graphics image for modulating the intensity of the surfaces to simulate the effects of the light sources present in the scene of the computer graphics image to be rendered, or in vertices representing the object surface, e.g. in case the object surface is built up of a polygon mesh.

For diffuse and ambient lighting, preferably all light sources present in the scene are selected to be approximated by a fictitious single light source for pre-calculating the complex lighting situation. In contrast, for specular lighting, preferably only a few of the light sources present in the scene to be rendered are selected in accordance with an appropriate selecting criterion, e.g. the brightness of the respective specular light sources, orientation with regard to a viewing direction of a viewer viewing the scene to be rendered, distance to the viewer and the like, while other lights sources that do not fulfill the criterion are neglected.

For rendering both the data or coefficients of the pre-calculated lighting condition and the texture map to be cast onto the object surface is retrieved, preferably in one pass. An advantage is that the method according to the present invention is highly flexible and quick. The texture map may have a high surface resolution and may be calculated with appropriate surface rendering algorithms, including, but not limited to, bump mapping. The static lighting condition, on the other hand, may be calculated in advance with high quality including, but not limited to, soft shadows, radiosity and area light sources. As the pre-calculated lighting information may be reused for subsequent images to be rendered a high quality lighting calculation with bump mapping is achieved.

Instead of storing the pre-calculated data or coefficients on lighting in lightmaps they may also be stored in vertices of polygons or similar geometric primitives of a tessellated mesh building up the object surface to be rendered. As the pre-calculated lighting information is highly compressed as compared to computing the lighting conditions in multiple passes for every light source present in the scene to be rendered, memory space available for intermediately storing data on the polygons or geometric primitives of the object surface is not exceeded by adding information on the lighting condition to the data of the vertices. Thus, the present invention provides for an efficient data management in computer graphics cards even of standards or provided with low computing power and a small memory.

According to another embodiment the lighting information stored in a vertex of a polygon or geometric primitive of the object surface may be interpolated across a surface of the polygon or geometric primitive. Interpolation provides for an even better realism and appearance of lighting in the computer graphics image to be rendered.

The step of calculating said approximated light direction may comprise a step of computing a normalized light direction for a given surface position and a given position of a respective one of said selected light sources. The normalized light directions weighted with a respective luminance or brightness value for all selected light sources or with a suitable attenuation factor or with a shadow term may then be summed up in a subsequent step.

For avoiding that the length of the vector of the approximated light direction obtained exceeds unity, a further step may be provided in the step of calculating said approximated light direction comprising summing up all luminance values of said selected light sources for obtaining a maximum length of a vector of said approximated light direction. Calculating the maximum length vector assumes, for the moment, that all light vectors of the light sources present in the scene to be rendered point into the same direction.

The maximum length vector may be used in a subsequent step for calculating a blend factor by dividing the length of the vector of the approximated light direction by the maximum length if the maximum length is larger than zero. On the other hand, if the maximum length is not larger than zero, the blend factor according to this embodiment is set to unity. Thus, according to the method of the present invention the blend factor obtained preferably lies within the range extending between zero and unity. Thus, a division by zero is reliably prevented. Further, the blend factor may be used for an efficient blending of image information while ensuring that light intensity (luminance) does not exceed the admitted range.

Alternatively, the blend factor may be calculated in such a manner that it corresponds to a fraction of a vector of the approximated light direction with the maximum length that is computed as described above. The blend factor is preferably computed for each surface element of the object surface and may be one of an object present in the scene to be rendered, a texel (or texture element) and a vertex of a polygon or other geometric primitive building up the object surface.

A further step may be provided of computing high-frequency details of the object surface using the above approximated light direction vector.

The blend factor is preferably used for blending between the high-frequency details of the object surface and low-frequency details stored in the coefficients representing the lighting conditions.

For rendering the computer graphics image, the texture map and either the lightmap or the lighting information stored in the vertices are retrieved and blended by means of the blend factor to thereby obtain final graphics data used subsequently for rendering. Thus, the method according to the present invention enables high quality lighting pre-calculation together with bump mapping.

Of course, the method for computing the texture map on the object surface is not limited to bump mapping but may include instead other suitable methods as well as will become apparent to the person skilled in the art. Thus, use of the above blend factor provides for an even better flexibility and realism of the computer graphics image rendered.

In any of the above embodiments, a further step may be provided in the step of calculating the approximated light color comprising computing a weighting factor for weighting a contribution of a respective selected light source, said weighting factor including at least one of an attenuation factor for simulating an attenuation of said selected light source due to at least a distance between said selected light source and a respective surface element of said object surface and a Lambert factor contributing to an angle of incidence of light emanating from said selected light source onto said respective surface element. Instead of using a Lambert factor a factor may be used representing the shadowing conditions, e.g. the shadowing percentage. Weighting enables an even more accurate pre-calculating of the lighting conditions taking into account as well material-dependent properties of the object surface, in particular reflectivity, light absorption. Other appropriate weighting factors will become apparent to the person skilled in the art when studying the present application.

The above blend factor may be computed for the entire computer graphics image to be rendered, which saves computer memory. According to another embodiment, the blend factor may be calculated for each surface element or for certain portions of said object surface, which provides for an even better realism and appearance of the computer graphics image to be rendered.

In such an embodiment the surface element may be a texel of said object surface or a vertex of a polygon or geometric primitive representing said object surface or a pixel of said computer graphics image to be rendered or any other appropriate subset of the object surface to be rendered.

In the above method, a result of the step of pre-calculating the substantially static lighting condition may be stored in two low-resolution textures, namely a first texture storing said approximated light color together with said blend factor and a second texture storing said normalized approximated light direction. Thus, the method according to the present invention is highly efficient as regards consumption of memory space.

For correcting certain inaccuracies and even further improving the realism of the computer graphics image to be rendered, the above method may comprise a further step of determining a maximum of components of a vector of said approximated light color, so that, if the maximum determined is larger than one, the vector of the approximated light color is normalized by the maximum determined prior to rendering said computer graphics image. Normalizing thus avoids image areas of over-saturated colors.

The above method may further comprise a step of shifting the blend factor into an acceptable range if said maximum is larger than one, the acceptable range being defined preferably as ranging between zero and unity. A simple saturation function may be used for avoiding fading away bumps too early for very bright light sources.

Because of the above per pixel dot3 operation the stored color is darkened because of performing the above Lambert calculation already in the pre-calculating step. In the above method a correction factor may be calculated, the correction factor being a maximum of a predetermined minimum value and a scalar product between a normal vector onto a respective surface element and the approximated light direction vector, wherein the vector of the approximated light color is normalized by the correction factor prior to rendering the computer graphics image if the correction factor is larger than one.

In the above method, in particular for rendering computer graphics images including specular reflections, the selected light sources may be selected based on an appropriate selection criterion, which could be the brightness, the position of the light source, the orientation of the light with respect to a surface normal of the object surface and the point of view of a viewer viewing the scene to be rendered and the like.

For pre-calculating lighting conditions in the case of specular lighting there may be provided a step of limiting the total number of light sources per vertex or area of the object surface to only the main contributors, i.e. those main light sources that contribute most intensely to lighting. During reconstruction or rendering the main light sources thus selected may be weighted in accordance with additional data, e.g. the eye position of a viewer viewing the scene to be rendered from a given position. Preferably only one light direction is passed to subsequent per pixel specular calculation.

Preferably for per-calculating lighting conditions in the case of specular lighting one may start with a step of computing a half-angle vector by normalizing a sum of said normalized approximated light direction and a normalized eye direction for each light source. Further, the weighting factor of each selected one of said light sources is preferably a clamped scalar product of said half angle vector with a vertex normal raised to the power of a given constant. Depending on normal perturbation and specular power value, a fixed constant of e.g. 16 may be used. The weighted light directions are then added together and normalized resulting in a view dependent version of the weighted light sources. Further, there is provided a step of scaling the sum of the weighted light sources by an inverse of the weighted sum to thereby provide a blended color of the calculated light direction.

BRIEF DESCRIPTION OF THE DRAWINGS

Further features and advantages of the present invention, as well as the structure and operation of various illustrative embodiments of the present invention, are described in detail below with reference to the accompanying drawings, wherein:

FIG. 1 schematically illustrates an algorithm for pre-calculating and compressing a complex lighting situation of a diffuse object surface according to a first embodiment of the present invention;

FIG. 5 schematically illustrates an algorithm for pre-calculating and compressing a complex lighting situation of a diffuse object surface according to another embodiment of the present invention.

In the figures, like reference numerals indicate identical or functionally similar features and elements unless otherwise said.

DETAILED DESCRIPTION OF THE EMBODIMENTS

Figure 2:
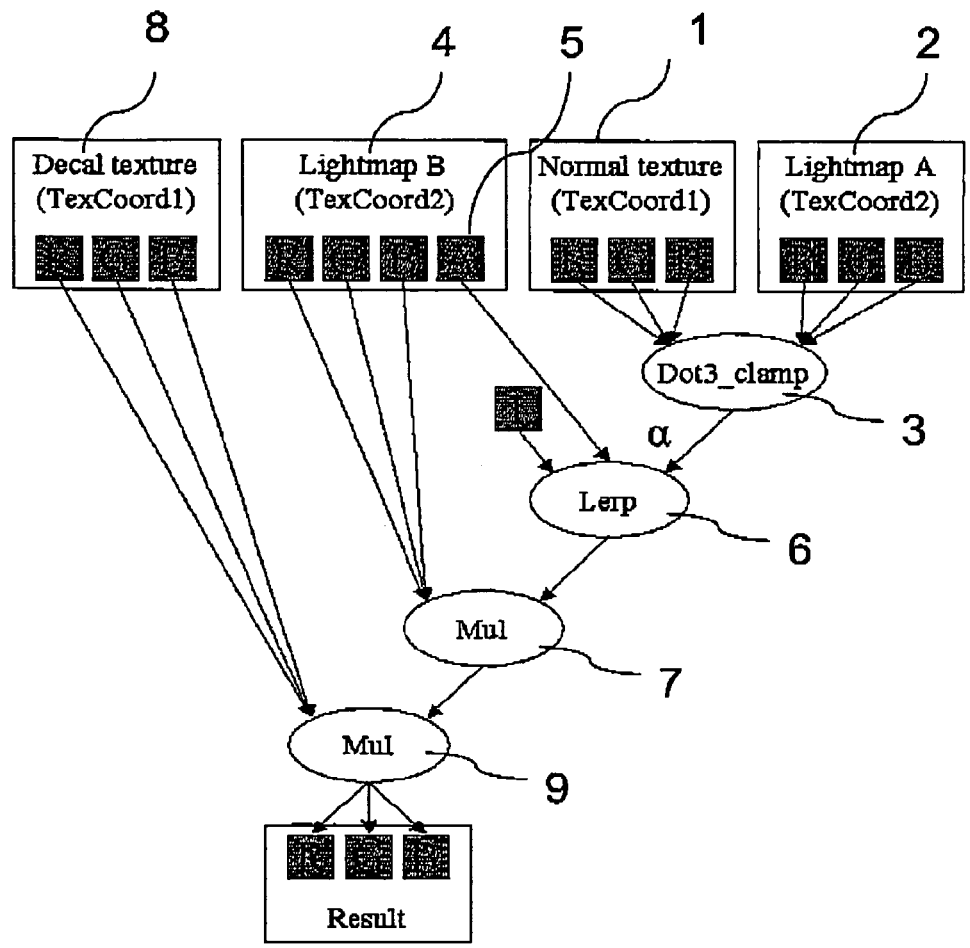
FIG. 2 shows how the compressed lighting condition according to FIG. 1 is stored in lightmaps and then uncompressed.

The present invention is described in terms of an example computer graphics processing environment. Given the description herein, it would be obvious to one skilled in the art to implement the present invention in any computer graphics system including, but not limited to, a computer graphics processor (single chip or multiple chips), high end to low end graphics workstations, gaming platforms, systems and consoles, network architectures (for example client/server, local, intermediate or wide area networks), and virtual machine (for example Java-created application). Any computer graphics architecture can be based including, but not limited to, an Open GL architecture and raster graphics architectures.

Description in these terms is provided for convenience only. It is not intended that the invention be limited to application in this example environment but in fact, after reading the foregoing description, it will become apparent to a person skilled in the relevant art how to implement the invention in alternative environments.

First Embodiment

In the following a preferred example of a method according to a first embodiment of the present invention will be described with reference to FIG. 1. The process according to FIG. 1 is performed preferably as a pre-process, i.e. a procedure of pre-calculating, for compressing a complex lighting condition of a diffuse material. It is assumed that the object surface in the computer graphics image is illuminated by at least two light sources positioned at different positions in a three-dimensional space. From these light sources a subset of light sources is selected that are apt to illuminate the respective surface element to be processed and rendered. Hence, if objects are present in the light path between a respective light source and the surface element to be processed, such a light source is not necessarily taken into account for computing the complex lighting situation. Instead, such a light source can be neglected. A further example for selecting a subset of light sources among all light sources present in the three-dimensional computer graphics image to be rendered would be selecting only those light sources that contribute to specular reflection from an object surface taking into account the respective position and orientation of the light source, the object surface and the viewing angle of a viewer viewing the computer graphics image to be rendered. Computing of lighting conditions in case of specular reflection will be discussed below with reference to FIG. 4. Referring to FIG. 1, the process is performed per surface element of the object surface to be rendered, which may be any of a texel or texture element in a lightmap texture, a vertex of a polygon mesh representing the object surface, the polygon representing merely an example of geometric primitives used for building up the complex object surface, or simply may be each individual pixel to be rendered. During the preprocess three values are calculated for every surface element, namely the output light color Ocol, the approximated light direction Odir and a blend factor used to perform the blending between a lightmap and a surface texture, in particular a bump map surface texture (Dot3solutIon).

As shown in FIG. 1, the algorithm is performed for each surface element S of the object surface, each surface element of the object surface being defined by a position Spos and by a surface normal vector Snorm. In a first step, S1, the output parameters of the algorithm and intermediate values are reset to zero, namely the output color, Ocol, the output direction or approximated light direction to be computed, Odir, and the parameter Osum to be explained later. The entire algorithm is to be performed for each incoming light element, which is checked at step S2 to be followed by steps S3–S16.

Each incoming light element is characterized by a respective light position, Lpos, which is a vector comprising three components in three-dimensional space, a respective light color Lcol, which is represented by a vector comprising the three color components, e.g. r (red), g (green) and b (blue) in three-dimensional RGB-color space, and by a respective attenuation factor Latt.

While the description is only with reference to the commonly known RGB-color space, the present invention is not construed to be limited to RGB-color-space but may be performed as well with other color spaces as will become apparent to the person skilled in the art.

In step S3, for each light source illuminating the computer graphics image, a respective attenuation factor att is computed as to lie within the range between zero and one. The light attenuation factor att at least contributes to the distance between the position of the respective light source and the surface element currently processed but may contribute also to other factors, such as attenuation due to opaque objects in the light path between the respective light source and the surface element currently processed. Accordingly, the light attenuation factor att usually will have an inverse linear and/or inverse quadratic dependency on the distance between the respective light source and the surface element currently processed. Other attenuation functions may be used as well as will be apparent to the person skilled in the art.

In step S4, for each light source, a normalized light direction dir is calculated, which is a vector. The normalized light direction is calculated by computing a vector difference between the position of the respective surface element currently processed, Spos, and the position of the respective light source, Lpos. The vector difference is normalized by dividing the difference by the length of the vector difference as is well known to a person skilled in the art.

In step S5 a visibility factor vis is calculated which is to contribute to whether or not there exists an intransparent object in the light path between the respective light source and the respective surface element currently processed (which will be described below). In a basic version, the visibility factor is calculated by determining, on the basis of the known position of the respective surface element currently processed and of the position of the respective light source, whether or not or not the respective surface element is in front of or behind the intransparent object, as seen from the respective light source. If the respective surface element is in front of the object, the visibility factor vis is set to one whereas, if the respective surface element is behind the object, the visibility factor vis is set to zero thus ensuring a vanishing contribution of the respective surface element to computing the lighting condition in all subsequent process steps. The visibility factor is, of course, more correct if shadows of additional objects are also taken into account, as will become apparent to the person skilled in the art when studying the specification.

Subsequently the process proceeds with step S6, where all lightmap contributions are summed up for obtaining an approximated light color. As can be seen in FIG. 1, for obtaining an approximated light color Ocol, the respective light color Lcol of the respective light source is weighted with weighting factors, in this case the above visibility factor vis, the above attenuation factor att and the light color Lcol. The weighted result is then added to the preceding approximated light color Ocol for obtaining a new value for the approximated light color. Thus the approximated light color is a sum of all light contributions contributing to illumination of the respective surface element by all light sources.

Subsequently, the process proceeds with step S7, where a luminance or luminous value lum is computed. The resulting luminance is a number consisting of the sum of the respective light color components Lcol_r, Lcol_g and Lcol_b of the respective light source in RGB color space multiplied by the above attenuation factor att and the above visibility factor vis.

The luminance thus computed is subsequently used in step S8 for computing an approximated light direction Odir. The approximated light direction Odir is the sum of the previous approximated light direction Odir and the product of the above normalized light direction dir and the above luminance value lum. The approximated light direction Odir is a vector representing the approximated direction of all light sources taken into account so far and illuminating the surface element currently processed. The approximated light direction Odir is used in the subsequent step S10 for computing a blend factor Olerp to be described later.

Further, in step S9, the maximum length of the sum light vector is computed assuming, for the moment, that all vectors point in the same direction, which is, of course, not the case. Thus, the maximum light vector length may be computed as a number simply by computing the sum of all luminance values lum. For this purpose, the luminance of the respective light source under process is added to the maximum light vector length Osum of the previous iteration.

The above steps S3 to S9 are performed for all light sources illuminating the surface element currently processed. In case of diffuse illumination all light sources present in the computer graphics image to be rendered may contribute to the illumination. However, in other cases, like specular reflection from a specular object surface, only selected ones of these light sources may contribute to the illumination of the respective surface element currently processed as will be described below with reference to FIG. 4.

The process then proceeds to step S10, where a blend or lerp factor Olerp is computed by dividing the length of the approximated light direction vector Odir by the maximum length Osum of the approximated light direction vector Odir assuming that all light sources contributing to illumination of the surface element currently processed point into the same direction. The blend factor Olerp is a number that is used later for a blending process for blending between a lightmap and an object surface texture, in particular a bump map texture of the object to be rendered.

As shown in FIG. 1, for computing the blend factor it is first determined whether the maximum light vector length Osum is larger than a predetermined minimum value, which is assumed as zero in the present case but may, in principle, be represented by a small non-vanishing minimum value instead. If it is determined that the maximum light vector length Osum is larger than zero then the above division is performed. Otherwise, the blend factor Olerp is set to unity (1).

The following method steps S11 to S16 are, in principle, not absolutely necessary for performing the method according to the present invention. Instead, these method steps are performed for compensating certain inaccuracies and imperfections of the above method as will be outlined below.

In step S11 the approximated light direction vector Odir is normalized, because compression of normalized vectors may be achieved easier and because the length is not needed anymore. Normalization is performed by dividing the approximated light direction vector Odir with the length thereof.

A first inaccuracy can be attributed to imperfections in rasterizing color values with a given byte-length. E.g. if 8 bits are used for encoding a given color value in the lightmap, a total of 256 graduations for the color value are available. However, in the above method steps S1 to S10 it may occur that a color value with graduation larger than 256 is computed, which would result in an unrealistic color saturation that may be detected easily in the computer graphics image and obviates a quality thereof.

Such imperfections and inaccuracies are balanced by performing the following method steps S12 to S16.

Namely, in step S12 a maximum value bright of the RGB-components Ocol_r, Ocol_g and Ocol_b of the vector Ocol is determined. The resulting value bright is the maximum of all three RGB-components.

The maximum value bright thus obtained is used in the subsequent step S13 as a basis for determining whether such color saturation effects have occurred. As any of the RGB-components of the approximated light color vector Ocol may not exceed unity (one), the approximated light color vector Ocol is normalized in step S14, if the maximum value bright exceeds unity (one). Normalization is achieved by dividing the approximated light color Ocol by the maximum value bright. Thus, all color components of the approximated light color vector Ocol are reduced in a linear manner. On the other hand, if it is determined in step S13 that the maximum value bright does not exceed unity (one) the method of the present embodiment stops.

In step S15 a soft correction factor fac is computed based on the maximum value bright. The soft correction factor fac is computed by subtracting the inverse of the maximum value bright from a fixed value of two. In case the maximum brightness value bright exceeds one, the soft correction factor will then be larger than one whereas, if the maximum brightness value does not exceed one, the soft correction factor will be smaller than one. In any case it is ensured that the soft correction factor lies within a range between (but excluding) two and zero.

Further, if it is determined in step S13 that the maximum value bright exceeds unity (one), in step S16 also the above blend factor Olerp is shifted into a range of acceptable blending values, which extends from 0 (zero) to unity (one). As shown in FIG. 1, the shifted blend factor Olerp corresponds to the maximum between a predetermined minimum value, which for illustrative purposes has been selected as zero in the present embodiment but may be replaced by any other suitable small value smaller than unity (one), and the difference between the previously calculated blend factor Olerp and the above soft correction value fac, said difference being shifted into the acceptable range (extending between 0 (zero) and unity (one)) by adding a unity value (one) to the difference such calculated.

The shifted blend factor Olerp thus obtained is then used in the standard way, as set forth below, for rendering the entire computer graphics image.

By repeating the above method steps S1 to S16 for all surface elements of the object surface of the computer graphics image, one obtains finally a lightmap, which is a texture map to be applied to the surface of the computer graphics image to be rendered for modulating the intensity of the surfaces thus simulating the effects of illumination by the selected ones of the light sources present in the 3-D scene to be rendered. More specifically, according to the present embodiment one obtains the approximated light direction Odir and the blend factor Olerp, which are respectively stored in a texture map. As the averaging process performed above causes that the approximated light direction Odir and the blend factor Olerp varies only gradually in space, according to the present invention one may make use of low-resolution textures for storing the parameters Odir and Olerp describing the pre-calculated lighting conditions, despite the possibly complex geometry of the object surface to be rendered and the possibly complex arrangement of the light sources in the computer graphics image to be rendered.

Thus, according to the present invention cheap but fast memory elements may be used for calculating even complex lighting conditions. Further, according to the present invention the entire computer graphics image is rendered by retrieving on the one hand high-resolution texture maps, in particular texture maps calculated with bump mapping for highly accurate and resolved surface effects, and on the other hand low-resolution texture maps describing, in a highly compressed manner complex lighting conditions. Thus, according to the present invention it becomes possible to achieve a highly realistic computer graphics image including high-resolution surface effects at reduced computing power and computing time, as only a part of the parameters used for rendering the entire computer graphics image have to be computed at high resolution and for each frame to be rendered. This enables also computing video sequences consisting of individual frames of high spatial resolution and with high-resolution surface effects, including bump mapping of the surfaces of the computer graphics images of such frames.

Referring now to FIG. 2, it is illustrated how according to the present embodiment the compressed, pre-calculated lighting conditions are retrieved for rendering a computer graphics image at high resolution and including highly realistic surface relief effects and illumination effects.

More specifically, as stated above the results of the averaging process described with reference to FIG. 1, are stored in low-resolution texture maps. Namely, in the present embodiment the approximated light color Ocol is stored in a texture 4 (lightmap B) together with the blend factor Olerp in the alpha channel 5 (A), whereas the normalized, approximated light direction Odir is stored in a second texture 8 (Decal texture). Further, for obtaining highly realistic, high-resolution surface effects the present embodiment further comprises a high frequency normal map 2 and an additional texture map 1 used to reflect high frequency color changes in the material. The high frequency normal map 2 may be generated by standard bump mapping as disclosed e.g. in U.S. Pat. No. 5,880,736, which is to be incorporated in the present invention by way of cross-referencing. Use of other computing processes for obtaining similar high-frequency normal maps will become apparent to the person skilled in the art when studying the present specification.

In a first rendering step the two high frequency texture maps 1 and 2 are Dot3_clamped in the process block 3, which performs the process of computing the dot (scalar) product between the two vectors stored in the textures and clamping (shifting) the result to only positive values. As is known to the person skilled in the art, this operation may be represented as follows:

Color $Dot3\_Clamp$(Color $A$, Color $B$)=max(0, $(A.r-0.5)*(B.r-0.5)+(A.g-0.5)*(B.g-0.5)+ (A.b-0.5)*(B.b-0.5)))*4$ where Color A and Color B respectively are color vectors that may be expressed in the standard form $(A.r, A.g, A.b)^T$ in three-dimensional RGB-color space.

Thus a high-frequency, high-resolution surface texture of the object surface is obtained. In a subsequent rendering step the high-resolution surface texture is blended in process block 6 (Lerp) with the low-resolution approximated light color texture map 4 by performing a linear interpolation (Lerp) between the respective vectors with the factor alpha corresponding to the blend factor Olerp calculated in accordance with the method steps described with reference to FIG. 1 and lying with the range between zero (0) and unity (1).

More specifically, a linear interpolation of the above kind between two color vectors Color A and Color B with the range factor f in the range between zero (0) and unity (1) may be expressed as follows:

Color Lerp(Color $A$, Color $B$, $f$)=Color($A.r*(1-f)+B.r$, $A.g*(1-f)+B.g$, $A.b*(1-f)+B.b$)

For obtaining the final texture to be rendered, the output of process block 7 is subsequently multiplied component-wise in process block 9 with the normalized, approximated light direction Odir obtained in accordance with the method steps described with reference to FIG. 1.

More specifically, the component-wise multiplication Mul of two color vectors Color A and Color B can be expressed as follows:

Color Mul(Color $A$, Color $B$)=Color($A.r*B.r$, $A.g*B.g$, $A.b*B.b$)

The output of the above retrieval process is then used for rendering the computer graphics image. As shown in FIG. 2, the output of the above retrieval process may be intermediately stored in a memory block 10 which is segmented into the respective color components R, G and B. The content of memory block 10 may be retrieved in a standard way by other components of the computer system environment or of a standard computer graphics card.

The above process of retrieving diffuse data stored in lightmaps or textures is particularly suited for rendering of computer graphics images using low tessellated meshes.

Second Embodiment

According to the first embodiment, the result of the approximation according to FIG. 2, which expressed in a compressed manner a complex lighting situation, is stored in two texture maps. The present invention is, however, not limited on such a storing scheme but may be implemented in a different manner.

Merely for illustrative purposes, in the following the basic principles of a second embodiment will be described. In the following it is assumed that the process of pre-calculating the complex lighting situation is performed in a substantially identical manner as the process described with reference to FIG. 1. However, according to the second embodiment the output of the above process of pre-calculating, namely the approximated light color, the approximated light direction and the blend factor between the lightmap and the high-resolution surface texture, is stored instead in vertex components of polygons building up the object surface to be rendered in three-dimensional space of the computer graphics image. For this purpose two to four bytes for the approximated light direction and four bytes for the light color and the blend factor are required.

For further improving the accuracy and realism of the computer graphics image to be rendered, interpolators may be provided for performing any suitable type of interpolation across a polygon of the complex object surface to be rendered, said interpolation process including, but not limited to, linear interpolation, Barycentric interpolation and high-order interpolation (e.g. quadratic and cubic interpolation). Such Interpolators, however, are optional in that they can be omitted depending upon design needs.

Such a procedure is in particular appropriate for highly tessellated, meshed object surfaces built up of a high number of geometric primitives like polygons.

Third Embodiment

While the above process has been described with reference to pre-calculating complex lighting conditions in case of diffuse lighting, the present invention is by no way limited to pre-calculating diffuse lighting conditions. Instead, according to a third embodiment, which will be described in the following and may be combined with any of the other embodiments described in the specification, also complex lighting situations including specular reflection of light emanating from one or more light sources and being reflected by an object surface may be pre-calculated.

In addition to the above process of pre-calculating, for every stored light source the normalized light direction calculated in step S4 of the process according to FIG. 1 is used to calculate the half-angle vector (direction where the highlight is located) by normalizing the sum of the normalized light direction and the normalized eye direction.

For approximating the lighting situation a weight factor for weighting the light sources is required. According to the third embodiment the weight of each light source is the clamped (negative values are shifted to zero) scalar product of the Half Angle vector with the vertex normal raised to the power of a given constant. The inventor has found out that a power of 16 is sufficient so that the above process can be performed efficiently with only four multiplication operations (in parallel with the other light sources).

The power function ensures that the highlights of specular reflections are only blended together if they are very near to each other. Reducing the power factor broadens the angle area of candidate light sources contributing to specular reflection while enlarging the power factor narrows the angle area of candidate light sources contributing to specular reflection. Thus, by varying the power factor, in accordance with the requirements of the computer graphics image to be rendered and the lighting conditions, for each surface element of the object surface the angle area of candidate light sources contributing to specular reflection can be varied in an efficient manner. Thus, a low amount of candidate light sources contributing to specular lighting can be selected among the various light sources present in the scene of the computer graphics image to be rendered.

Preferably, the power factor is constant over the entire computer graphics image to be rendered. However, according to another modification of the present invention the power factor may also be varied between different parts of the image. Or, according to another modification, the power factor may be modified between subsequent frames of a video sequence to be rendered.

Adding the weighted light directions together and normalizing the result reconstructs the approximated light direction. Adding the weighted light colors together and scaling the result then by the inverse of the weighted sum reconstructs the approximated light color. The light direction and color is then used as input for standard Blinn shading code.

Thus, during rendering from the eye position an average light direction and color similar to the diffuse calculation performed according to the first embodiment is computed. The above averaging process according to the present invention saves a lot of fill rate at the cost of vertex calculations. However, with computer graphics cards now available vertices can be computed at high rates in an efficient and cost effective manner.

Figure 3:
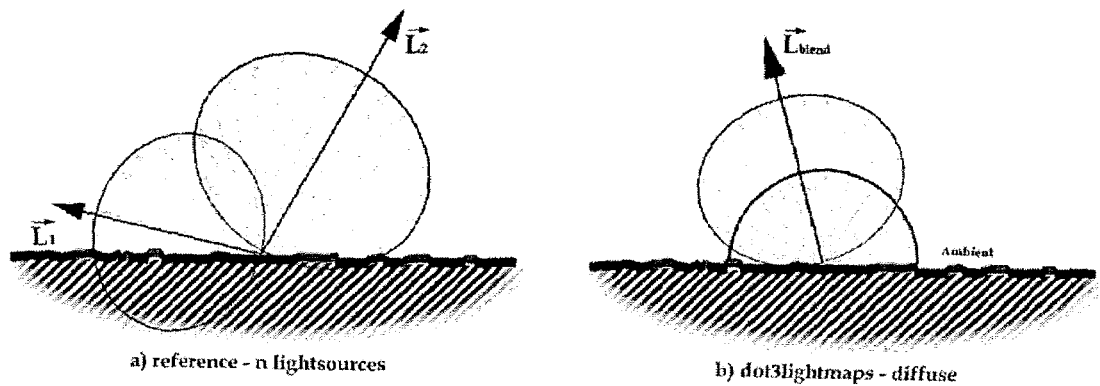
FIG. 3 shows a light reaction function for a diffuse material.

Referring now to FIG. 3 there is shown a light reaction function for a diffuse material. In the left-hand side of FIG. 3 there is shown the light direction vectors for two light beams L1 and L2 of light sources (not shown) that are reflected by the diffuse object surface. The lobes around each light direction vector indicate the respective angular distribution of the reflected light intensity. In FIG. 3, the length of a respective light direction vector indicates the respective light intensity. As shown in FIG. 3a, the light intensity of the reflected light of light source no. 2 is larger by a factor of approx. 1.5 than the intensity of reflected light of light source no. 1. The right-hand part of FIG. 3 shows the approximated averaged light direction as computed by the method steps of FIG. 1. In FIG. 3b the reflected light is approximated by an average light direction Lblend which extends near the bisecting line between the light direction vectors L1 and L2 but is shifted slightly to the right-hand side of the bisecting line because the intensity of the light direction vector L2 (which lies to the right-hand side of the bisecting line) is larger than the intensity of the light direction vector L1 (which lies to the left-hand side of the bisecting line). Thus, the complex lighting situation shown in FIG. 3a (consisting of two light sources illuminating the object surface) is approximated by illumination by a single light source as shown in FIG. 3b to thereby reduce the requirements as to computing power substantially. As shown in FIG. 3b, the ambient fraction of the reflected light intensity is relatively large, which is caused by the surface properties of the diffuse material reflecting the light intensities.

Figure 4:
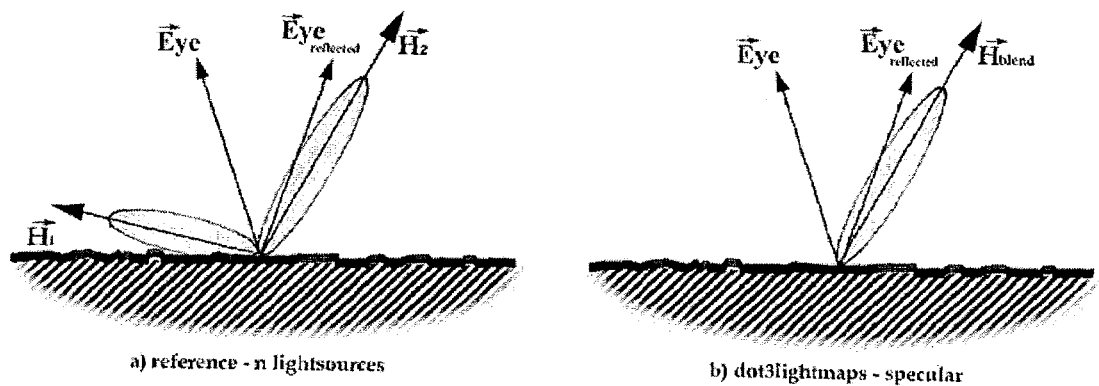
FIG. 4 shows a light reaction function for a specular material.

Referring now to FIG. 4 there is shown a light reaction function for a specular material. In the left-hand side of FIG. 4 there is shown the light direction vectors for two light beams H1 and H2 of light sources (not shown) that are reflected by the specular object surface. The lobes around each light direction vector indicate the respective angular distribution of the reflected light intensity. As can be derived from a comparison between FIG. 3 and FIG. 4, in the case of specular reflection the ambient fraction of the reflected light intensity is much smaller, as the reflection is much more directional in case of specular reflection.

In FIG. 4, the length of a respective light direction vector indicates the respective light intensity. As shown in FIG. 4a, the light intensity of the reflected light of light source no. 2 is larger by a factor of approx. 1.5 than the intensity of reflected light of light source no. 1.

In FIG. 4, the vector Eye indicates the direction of an eye of a viewer viewing the scene to be rendered. In FIG. 4 the viewer views the surface of the reflecting object from a position lying close to or on the bisecting line between the two light direction vectors H1 and H2. In FIG. 4a, the vector Eye_reflected indicates the vector Eye mirrored about a normal onto the respective surface element. For the case of an ideal specular reflection, following the basic formulas of the law of reflection, light can only be reflected into the eye of the viewer if it falls onto the specular surface along the direction of light vector Eye_reflected. As an eye can collect light from an angular range, in reality light from a certain angular range has to be taken into account for simulating light reflection.

The right-hand part of FIG. 4 shows the approximated averaged light direction as computed by the method steps of FIG. 1. In FIG. 4b the reflected light is approximated by an average light direction Hblend which substantially corresponds to light direction vector H2. The reason is that light direction vector H1 lies far away from the surface normal and the eye direction Eye so that according to the laws of reflection light of H1 can not be reflected in the eye of the viewer. Thus, the complex lighting situation shown in FIG. 4a (consisting of two light sources illuminating the object surface) is approximated by illumination by a single light source as shown in FIG. 4b to thereby reduce the requirements as to computing power substantially.

FIG. 5 schematically illustrates an algorithm for pre-calculating and compressing a complex lighting situation of a diffuse object surface according to another embodiment of the present invention. The method steps according to FIG. 5 differ in that certain approximations as described below are performed differently, whereas the main method steps are substantially identical to those of the embodiment according to FIG. 1. Accordingly, the following concentrates on these differences.

Referring now to FIG. 5, steps S51 to S53, S57 to S60, S63 to S65 and S66 according to FIG. 5 are identical to steps S2 to S4, S8 to S11, S12 to S14 and S16 according to FIG. 1.

A difference in this embodiment is that in step S54 according to FIG. 5 a Lambert factor lamb is calculated in addition to the visibility factor vis (compare step S5). The Lambert factor lamb is to contribute to the angle of incidence of light emanating from the respective light source onto the surface element currently processed. The Lambert factor is calculated by taking the maximum of a predetermined minimum value, in this case zero, and the scalar product between the normal onto the respective surface element, Snorm, and a vector Ldir connecting the respective surface element currently processed with the respective light source. If the surface element currently processed is a pixel, for computing the surface normal, Snorm, an averaging process may be performed, for example for calculating an average surface normal onto a surface element composed of a predetermined number of pixels adjoining the pixel currently processed. Other appropriate measures for calculating a surface normal, Snorm, in case that the respective surface element currently processed is a pixel will become apparent to the person skilled in the art when studying this specification.

Taking the maximum in step S54 ensures that the Lambert factor lamb is always a positive number. In case the direction of the surface normal coincides with the light source direction, Ldir, the Lambert factor lamb is set to one. In case of a glazing incidence of light emanating from the respective light source, the Lambert factor computed is determined by the above predetermined minimum number, in this case zero. Other appropriate minimum numbers will become apparent to the person skilled in the art when studying this specification.

Thereafter the method proceeds with step S55, which is substantially identical to step S6, with the only exception that in addition to the visibility factor vis also the above Lambert factor lamb is used.

Thereafter the method proceeds with step S56 for calculating a luminance or luminous value lum. The resulting luminance is a number consisting of the sum of the respective light color components Lcol_r, Lcol_g and Lcol_b of the respective light source in RGB color space multiplied by the above attenuation factor att. In contrast to step S7, where the result is further multiplied with the visibility factor vis, the Lambert factor lamb is not used in step S56.

Another difference in the method according to FIG. 5 resides in the method steps S61 and S62 that are used to correct inaccuracies that can be attributed to imperfections when calculating ambient contributions in surface textures.

In step S61 there is calculated a correction factor corr as a maximum of a predetermined minimum value (which is chosen for illustrative purposes merely in the present embodiment as 0.01 but may be replaced by any other small number) and a scalar product between the normal vector Snorm onto the surface of the respective surface element currently processed and the above approximated light direction Odir of all selected light sources illuminating the surface element currently processed.

Prior to rendering the computer graphics image, the method proceeds then with step S62 for dividing the vector of the approximated light color Ocol by the correction factor corr thus calculated.

The remaining method steps of the process shown in FIG. 5 are substantially identical to those of the process according to FIG. 1 so that a further explanation is omitted hereinafter.

The computer program product according to the present invention is for use in appropriate data processing means for rendering computer graphics images. The computer program product may be stored in memory components, such as a ROM, a FLASH-ROM, an EEPROM or a non-volatile memory chip to be accessed by the data processing means, on data carriers, like CD-ROM, DVD, SmartCards, exchangeable FLASH-cards, or may be stored in external servers or the like, so that the computer program product may be downloaded to an application or data processing means, e.g. via a network, the Internet or a suitable communication link, for generating computer graphics images. The computer program product is implemented as a software, a software routine or software tool to be executed by the above data processing means.

The present invention also relates to a computer programmed to carry out the method as outlined above. In general, such a computer will be programmed with a computer program product as specified above.

What is claimed as new and is desired to be secured by Letter Patent of the United States is:

1. A method for lighting a computer graphics image, the computer graphics image including an object surface and at least two light sources illuminating said computer graphics image, comprising the steps of:
   computing a lighting condition of illuminating said computer graphics image;
   computing coefficients for multiple areas of said object surface;
   storing said coefficients for areas of said object surface; and
   rendering said computer graphics image by retrieving said stored coefficients;
   wherein said step of computing said lighting condition comprises a step of pre-calculating a substantially static lighting condition, comprising the steps of:
   a) calculating an approximated light direction for at least two selected ones of said light sources illuminating said computer graphics images, comprising the steps of:
      i. computing a normalized light direction for a given surface position and a given position of a respective one of said selected light sources;
      ii. summing up said normalized light directions weighted respectively with a luminance value for all selected light sources; and
      iii. summing up all luminance values of said selected light sources for obtaining a maximum length of a vector of said approximated light direction; and
   b) calculating an approximated light color for said selected light sources by weighting color contributions of said selected light sources;
   in which method said coefficients to be stored per object surface area are computed based on said step of pre-calculating.

2. The method according to claim 1, wherein said coefficients are stored in a form of one of a lightmap and vertices representing said object surface.

3. The method according to claim 1, wherein said area encompasses substantially the entire surface of an object of said computer graphics image so that said coefficients are stored per object of said computer graphics image.

4. The method of claim 1, wherein said step of calculating an approximated light color comprises computing a weighting factor for weighting a contribution of a respective selected light source, said weighting factor including at least one of an attenuation factor for simulating an attenuation of said selected light source due to at least a distance between said selected light source and a respective surface element of said object surface and a Lambert factor contributing to an angle of incidence of light emanating from said selected light source onto said respective surface element.

5. The method of claim 4, wherein said step of calculating said approximated light direction comprises computing a normalized light direction for a given surface position and a given position of a respective one of said selected light sources.

6. The method of claim 5, wherein said step of calculating said approximated light direction further comprises summing up said normalized light directions weighted with a respective luminance value for all selected light sources.

7. The method of claim 6, wherein said step of calculating said approximated light direction further comprises summing up all luminance values of said selected light sources for obtaining a maximum length of a vector of said approximated light direction.

8. The method of claim 1, further comprising calculating a blend factor, which corresponds to a fraction of a vector of said approximated light direction with said maximum length.

9. The method of claim 8, wherein said blend factor is calculated for each surface element of said object surface.

10. The method of claim 9, wherein said surface element is one of an object, a texel and a vertex of said object surface.

11. The method according to claim 10, further comprising the step of computing high-frequency details of said object surface using said approximated light direction vector.

12. The method of claim 11, wherein said step of rendering said computer graphics image comprises using said blend factor for blending between said high-frequency details of said object surface and low-frequency details stored in said coefficients.

13. The method of claim 10, wherein a result of said step of pre-calculating said substantially static lighting condition is stored in two low-resolution textures, a first texture storing said approximated light color together with said blend factor and a second texture storing said normalized approximated light direction.

14. The method of claim 10, wherein a result of said step of pre-calculating said substantially static lighting condition is stored in vertex components of vertices representing said object surface.

15. The method of claim 10, wherein a result of said step of pre-calculating said substantially static lighting condition is stored per object of said computer graphics image.

16. The method of claim 10, wherein a maximum of components of a vector of said approximated light color is determined, wherein, if said maximum is larger than one, said vector of said approximated light color is normalized by said maximum prior to rendering said computer graphics image.

17. The method of claim 16, further comprising a step of shifting said blend factor into an acceptable range if said maximum is larger than one.

18. The method according to claim 10, wherein a correction factor is calculated, said correction factor being a maximum of a predetermined minimum value and a scalar product between a normal vector onto a respective surface element and said approximated light direction vector, wherein said vector of said approximated light color is normalized by said correction factor prior to rendering said computer graphics image if said correction factor is larger than one.

19. The method of claim 1, wherein said selected ones of said light sources are selected based on their brightness.

20. The method of claim 1, wherein said selected ones of said light sources are selected depending on an eye position of a viewer viewing said computer graphics image to be rendered.

21. The method of claim 19, further comprising a step of calculating a half-angle vector by normalizing a sum of said normalized approximated light direction and a normalized eye direction.

22. The method of claim 21, wherein the weighting factor of each selected one of said light sources is a clamped scalar product of said half angle vector with a vertex normal raised to the power of a given constant.

23. The method of claim 22, further comprising adding together and normalizing weighted light directions and scaling a result thereof by an inverse of said weighted sum.

24. A computer program product comprising a computer usable medium having computer program code means recorded thereon for enabling a graphics processor in a computer system to illuminating a computer graphics image, the computer graphics image including an object surface and at least two light sources illuminating said computer graphics image, said computer program code means comprising:

program code means for computing a lighting condition of illuminating said computer graphics image;

program code means for computing a coefficients for multiple areas of said object surface;

program code means for storing said coefficients for areas of said object surface; and program code means for rendering said computer graphics image by retrieving said stored coefficients;

wherein said program code means for computing said lighting condition comprises a pre-calculating means for pre-calculating a substantially static lighting condition, comprising;

a) program code means for calculating an approximated light direction for at least two selected ones of said light sources illuminating said computer graphics image, said program code means for calculating said approximated light direction comprising:

i. a normalized light direction computing means for computing a normalized light direction for a given surface position and a given position of a respective one of said selected light sources; and ii. a summing means for summing up said normalized light directions respectively weighted with a luminance value for all selected light sources being configured for summing up all luminance values of said selected light sources for obtaining a maximum length of a vector of said approximated light direction; and b) program code means for calculating an approximated light color for said selected light sources by weighting color contributions of said selected light sources;

said computer program code means being configured for computing said coefficients to be stored per object surface area based on a result of said pre-calculating means.

25. The computer program product of claim 24, wherein said computer program code means is configured for storing said coefficients in a form of one of a lightmap and vertices representing said object surface.

26. The computer program product of claim 24, wherein said computer program code means is configured for enabling said area to encompass substantially the entire surface of an object of said computer graphics image so that said coefficients are stored per object of said computer graphics image.

27. The computer program product of claim 24, wherein said means for calculating said approximated light color is configured for computing a weighting factor for weighting a contribution of a respective selected light source, said weighting factor including at least one of an attenuation factor for simulating an attenuation of said selected light source due to at least a distance between said selected light source and a respective surface element of said object surface and a Lambert factor contributing to an angle of incidence of light emanating from said selected light source onto said respective surface element.

28. The computer program product of claim 27, wherein said means for calculating said approximated light direction is further configured for computing a normalized light direction for a given surface position and a given position of a respective one of said selected light sources.

29. The computer program product of claim 28, wherein said means for calculating said approximated light direction is further configured for summing up said normalized light directions weighted with a respective luminance value for all selected light sources.

30. The computer program product of claim 29, wherein said means for calculating said approximated light direction is further configured for summing up all luminance values of said selected light sources for obtaining a maximum length of a vector of said approximated light direction.

31. The computer program product of claim 24, further comprising a blend factor computing means for calculating a blend factor, which corresponds to a fraction of a vector of said approximated light direction with said maximum length.

32. The computer program product of claim 31, wherein said blend factor computing means is configured for calculating said blend factor for each surface element of said object surface.

33. The computer program product of claim 32, said computer program code means being configured for selected said surface element of one of an object, a texel and a vertex of said object surface.

34. The computer program product of claim 33, further comprising program code means for computing high-frequency details of said object surface using said approximated light direction vector.

35. The computer program product of claim 34, wherein said program code means for rendering is configured for rendering said computer graphics image using said blend factor for blending between said high-frequency details of said object surface and low-frequency details stored in said coefficients.

36. The computer program product of claim 33, wherein said pre-calculating means is configured for storing a result of pre-calculating said substantially static lighting condition in two low-resolution textures, a first texture storing said approximated light color together with said blend factor and a second texture storing said normalized approximated light direction.

37. The computer program product of claim 33, wherein said pre-calculating means is configured for storing a result of pre-calculating said substantially static lighting condition in vertex components of vertices representing said object surface.

38. The computer program product of claim 33, wherein said pre-calculating means is configured for storing a result of pre-calculating said substantially static lighting condition per object of said computer graphics image.

39. The computer program product of claim 33, further comprising a maximum determining means for determining a maximum of components of a vector of said approximated light color, wherein, if said maximum is larger than one, said vector of said approximated light color is normalized by said maximum prior to rendering said computer graphics image.

40. The computer program product of claim 39, further comprising a shifting means for shifting said blend factor into an acceptable range if said maximum is larger than one.

41. The computer program product according to claim 33, further comprising a correction factor computing means for calculating a correction factor, said correction factor being a maximum of a predetermined minimum value and a scalar product between a normal vector onto a respective surface element and said approximated light direction vector, wherein said vector of said approximated light color is normalized by said correction factor prior to rendering said computer graphics image if said correction factor is larger than one.

42. The computer program product of claim 24, wherein said computer program code means is configured for selecting said ones of said light sources based on their brightness.

43. The computer program product of claim 24, wherein said computer program code means is configured for selecting said ones of said light sources depending on an eye position of a viewer viewing said computer graphics image to be rendered.

44. The computer program product of claim 42, further comprising a half-angle vector computing means for calculating a half-angle vector by normalizing a sum of said normalized approximated light direction and a normalized eye direction.

45. The computer program product of claim 44, wherein said half-angle vector computing means is configured for clamping a weighting factor of each selected one of said light sources obtained by computing a scalar product of said half angle vector with a vertex normal raised to the power of a given constant.

46. The computer program product of claim 45, further comprising an adding means for adding together and normalizing weighted light directions and scaling a result thereof by an inverse of said weighted sum.

47. A computer programmed to carry out the method of claim 1.

48. A computer programmed with the computer program product of claim 24.

* * * * *